United States Patent Office 3,507,927
Patented Apr. 21, 1970

3,507,927
POLYMERIZATION PROCESSES EMPLOYING CHROMIUM SUB-HALIDE CATALYSTS
Jerome Robert Olechowski, Trenton, N.J., and Reginald F. Clark, Baton Rouge, La., assignors to Columbian Carbon Company, New York, N.Y., a corporation of Delaware
No Drawing. Filed Dec. 29, 1967, Ser. No. 694,408
Int. Cl. C07c 1/00
U.S. Cl. 260—666                              22 Claims

ABSTRACT OF THE DISCLOSURE

Processes are described for cyclooligomerizing conjugated aliphatic dienes in the presence of complex chromium sub-halides in which the formal valence of chromium is less than 2. The use of such catalysts, either alone or in combination with conventional Ziegler type reducing agents, is shown to produce cyclooctadiene and cyclododecatriene under moderate reaction conditions from 1,3-butadiene. Methods are also described for producing these complex chromium sub-halide catalysts by halogenating a chromium (O) complex.

BACKGROUND OF THE INVENTION

Field of the invention

This invention pertains to processes for producing cyclooligomers of conjugated aliphatic dienes (e.g. cyclododecatriene) by contacting the diene (e.g. 1,3-butadiene) with a catalyst comprising either a preformed complex chromium sub-halide (e.g. bis (benzene) chromium (I) iodide) or a mixture of a chromium (O) complex with a halogenating agent (e.g. bis (benzene) chromium (O) plus iodine) and, optionally, a reducing agent (e.g. triethyl aluminum). The invention also relates to novel catalyst compositions comprising a reducing agent and either a mixture of a chromium (O) complex with a halogenating agent or a preformed complex chromium sub-halide.

Description of the prior art

The cyclooligomerization of conjugated aliphatic dienes in the presence of a catalyst derived from an aluminum alkyl or hydride and a chromium (II), chromium (III), or chromium (VI) compound is described in U.S. Patents 3,167,593; 2,979,543; and 3,326,990. While such mixed component catalysts have been shown to be affective for the production of oligomers of butadiene at aluminum to chromium ratios as low as 1:1, much higher ratios have proved necessary with commercial grades of butadiene in order to achieve optimum catalyst activity and to compensate for the reaction of the aluminum compound component with impurities normally found in commercial grades of butadiene. The depletion of the aluminum component, coupled with the catalytic inactivity of chromium (II), (III) or (VI) compounds in the absence of such activator, often results in a rapid decline in reaction rate. The instant invention eliminates the need for an aluminum compound catalyst component or, where optionally employed, reduces the quantity necessary to maintain the optimum reaction rate.

SUMMARY OF THE INVENTION

Applicants have discovered that conjugated aliphatic dienes, such as 1,3-butadiene, isoprene or piperylene, can be cyclooligomerized in the presence of complex chromium sub-halides; i.e. coordination complexes of chromium halides in which the chromium atoms are present in an average oxidation state of less that +2 but more than 0. Unlike the more familiar chromium (O), (II), (III) and (VI) compounds, these sub-halides have been found to possess such catalytic activity in the absence of an aluminum alkyl or hydride cocatalyst. They may therefore be employed alone or, optionally, in the presence of a small quantity of reducing agent which is believed to function primarly to prevent the sub-halides from being disproportionated or oxidized to the inactive chromium (II) state by air or trace quantities of oxidizing agents present in commercial aliphatic conjugated dienes. Oligomerization can be effected simply by contacting the conjugated aliphatic diene with the complex chromium sub-halide under moderate conditions of temperature and pressure and recovering the oligomers by conventional means.

DESCRIPTION OF THE PREFERRED EMBODIMENTS

The complex chromium sub-halide catalysts of this invention contain both formal (non-coordinate) valence bonds between chromium and halogen atoms and coordination bonds between a chromium atom and at least one molecule having an electron pair available for sharing. Suitable election donor molecules or Lewis bases include compounds of trivalent Group VA elements, aromatic or unsaturated aliphatic or cycloaliphatic compounds, ethers, organic sulphides and carbon monoxide. Exemplary of these catalysts are the sub-halide salts of such chromium (O) complexes as bis (triphenyl phosphine) chromium tetracarbonyl, triphenyl arsine chromium pentacarbonyl, triphenyl stibine chromium pentacarbonyl, triphenyl phosphite chromium pentacarbonyl, tris (triphenyl phosphite) chromium tricarbonyl, chromium triammine tricarbonyl, bis (pyridine) chromium tetracarbonyl, chromium hexacarbonyl, chromium hexa (p-methoxyphenyl carbylamine), benzene chromium tricarbonyl, bis (tributylphosphite) chromium tetracarbonyl, tri-2-cyanoethylphosphite chromium pentacarbonyl, bis (benzene) chromium, bis (cumene) chromium and bis (cyclododecatriene) chromium. Although any complex chromium sub-halide may be used to cyclooligomerize conjugated aliphatic dienes, the preferred chromium sub-halides are those that are complexed with an unsaturated hydrocarbon, carbon monoxide or an ester of a trivalent Group VA element, and particularly those that are coordinatively bonded to an arene molecule or carbon monoxide and a phosphorus (III) ester.

These complex chromium sub-halides may be employed as pure preformed compounds, e.g. bis (benzene) chromium (I) iodide, bis (cumene) chromium (I) chloride or bis (naphthalene) chromium (I) bromide, or, preferably, as the unisolated sub-halide product of the halogenation of a chromium (O) complex in which the chromium exhibits a positive average formal valence of less than two. Representative examples of such chromium (O) complexes are shown in the preceding paragraph. The halogenation can be effected by the use of any of a variety of known procedures with conventional halogenating agents.

Examples of such known halogenating agents include such diverse materials as chlorine, bromine, boron trichloride, nitrogen trichloride, nitrosyl chloride, chlorine monoxide, chlorine monofluoride, aluminum bromide, silicon tetrachloride, phosphorus trichloride, sulfur dichloride, calcium chloride, tatanium tetrachloride, ferric chloride, stannic chloride, antimony tribromide, phenyl boron dibromide, dimethylchloramine, 3-chloro-1-ethylpiperidene, 2-chloromethyl-1-ethyl-pyrrolidine, chloro methyl silicone, phenyl magnesium bromide, dichlorophosphine, 2,5-dibromothiophene, dimethyl bromarsine, dimethyl tellurium dibromide, acetyl chloride, methyl bromide, t-butyl chloride, n-octyl chloride, cyclohexyl chloride, ethylene chloride, allyl chloride, triphenylmethyl chloride, bromobenzene, p-iodotoluene and p-dibromobenzene. Many of these materials are, for reasons such as poor solubility or reactivity under moderate conditions, corrosiveness, high cost, limited availability, etc., of more limited commercial utility than the preferred halogenating agents described hereinbelow.

Among the aforementioned halogenation procedures, two have been found to be particularly suitable because of their high reaction rates and ease of control under moderate conditions. The first, which is described by Razuvaev and Domrachev in Tetrahedron, 1963, vol. 19, pp. 341–3, utilizes an organic halogenating agent, such as an aliphatic halide, in an inert organic solvent, such as benzene or nitromethane. The second, which is described by Olechowski in copending application Ser. No. 694,410 filed Dec. 29, 1967, also employs an inert organic solvent, such as heptane or ethyl ether, in conjunction with an elemental halogen. Another preferred method, which proceeds rapidly at room temperature, involves the use of an aluminum halide, and particularly a hydrocarbyl aluminum halide, which quickly produces an unusually effective and stable sub-halide product, even in the absence of solvent.

While complex chromium (I) halides have been identified and recovered from certain of these reaction mixtures (as in Example 2A), many others produce a complex sub-halide product in which the chromium is found to have a fractional positive average formal valence of less than 2, and from which complex chromium (I) halides can not be isolated by simple extraction. The precise structure of such products is unknown, however, the fact that catalytically active materials in which the chromium has an average positive valence of from considerably less than 1 to close to 2 can be obtained by separating any unconsumed rectants and chromium (II) salts from a number of such catalytically active reaction mixtures suggests that the fractional average valence may result from the presence in a single complex molecule of chromium (O) (I) and (II) atoms or hybrids thereof.

Since these unisolated sub-halides, as well as the pure preformed complex chromium (I) halides, are susceptable (particularly in a synthesis mixture containing excess halogenating agent) to gradual oxidation to a catalytically inactive chromous salt or disproportionation to a chromous salt and equally inactive chromium (O) complex or metallic chromium, it is often advantageous to avoid prolonged storage of these materials or to store or employ them as cyclooligomerization catalysts in conjunction with a reducing agent such as any of those that have been shown in the prior art to be effective cocatalysts with chromium (II), (III) or (VI) compounds.

Illustrative of such commonly employed reducing agents are the hydrides and hydrocarbyl compounds of the metals of Groups I–III and boron; e.g. n-butyl lithium, ethyl sodium, sodium hydride, phenyl magnesium bromide, diethyl zinc, calcium-hydride, trimethyl borine, trimethyl aluminum, diethyl aluminum hydride, phenyl aluminum dibromide, ethoxy aluminum diethyl, lithium aluminum hydride and sodium borohydride.

The use, in a cyclooligomerization reaction, of trace quantities of a reducing agent, such as an aluminum alkyl, noticeably hinders oxidation of the catalyst and larger quantities, up to an Al:Cr atomic ratio of 8–12 or higher, significantly prolongs catalyst life. The presence of such reducing agent during the preparation of an unisolated sub-halide catalyst by halogenating a chromium (O) complex is also generally desirable, especially when the quantity of halogenating agent employed provides more than about two atoms of halogen per atom of chromium and immediate use of the catalyst is not contemplated. As indicated above, it is particularly advantageous to effect the halogenation of the chromium (O) complex with a hydrocarbyl aluminum halide, such as ethyl aluminum dichloride or diethyl aluminum chloride, as these halogenating agents also possess reducing properties and can therefore be used in any quantity to produce an unisolated sub-halide catalyst having both long shelf life and high activity.

The oligomerization of open chain conjugated aliphatic monomers, such as butadiene, isoprene or piperylene, in the presence of the catalysts of this invention may be conducted over a wide temperature range. Although satisfactory results can be obtained at temperatures below 0° C. or above 125° C., there is generally little advantage in operating outside the range of from about room temperature to about 100° C. In those cases in which the complex chromium sub-halide catalyst is prepared ex situ (by halogenating a chromium (O) complex in the absence of the diene), it is sometimes advantageous to initially employ a somewhat higher temperature in order to minimize the induction period. Such thermal initiation is seldom necessary when the sub-halide is prepared in situ, a preferred embodiment of this invention. Although not essential, the use of an inert solvent, such as benzene, toluene, heptane or tetrahydrofuran, is generally desirable for reaction temperature control purposes.

Similarly, such cyclooligomerization reactions may be conducted under pressures ranging from sub-atmospheric up to 100 atmospheres or higher; however, more moderate pressures have been found to be equally satisfactory. When the reaction is conducted in the absence of solvent or with insufficient solvent to dissolve significant amounts of a monomer which under atmospheric pressure and reaction temperatures is in the vapor phase, it is preferred to utilize elevated pressures. Thus, for example, in the cyclooligomerization of butadiene at a temperature of from about 25° C. to 100° C., superior results are obtained by operating at a pressure from about 30 p.s.i.g. to about 100 p.s.i.g. and maintaining this pressure during the course of the reaction by introducing additional butadiene as the monomeric material in the reactor is depleted.

The quantity of catalyst used in the process of the invention likewise may be varied over a wide range. In general, these catalysts are effective in amounts containing less than about 0.01 millimole of chromium to as much as 1 mole or more per mole of diene. In continuous reactions or semi-batch reactions (in which the diene has added on demand), the ratio of catalyst to unreacted monomer is generally considerably higher than in a batch reaction.

When metal alkyls or hydrides are employed in the preparation or use of the complex chromium sub-halides of this invention, it is essential that precautions be taken to protect these reducing agents from contact with excessive quantities of water, alcohol, carbon dioxide, oxygen or other extraneous materials with which they are known to react. While small quantities of such reactive impurities are tolerable, it is preferred that they be essentially excluded.

The numerous advantages inherent in the instant invention will be evident from an examination of the following comparative examples. Examples 2B, 3 through 10, 13 and 14 are conducted in accordance with this invention, whereas Examples 1, 11 and 12 are illustrative of similar procedures falling outside the scope of this inventive concept.

EXAMPLE 1

A clean dry magnetically stirred 300 milliliter autoclave is evacuated and charged with 1 gram of bis (benzene) chromium (O), 20 grams of dry benzene and 138 grams of 1,3-butadiene. The autoclave is stirred at 40° C. for 24 hours at which time the recovery of unreacted butadiene is essentially quantitative.

EXAMPLE 2A

A clean dry 250 ml. flask is charged with 125 ml. of anhydrous ethyl ether, 3 grams of bis (benzene) chromium (O) and 1.83 grams of resublimed iodine and stirred for five minutes. A yellow precipitate is separated by filtration, washed with additional anhydrous ethyl ether and dried under vacuum. The yield of the material, which is identified as high purity bis (benzene) chromium (I) iodide, is 96.7%.

EXAMPLE 2B

The procedure of Example 1 is repeated except that 1 gram (3 mmol) of the bis (benzene) choomium (I) iodide product of Example 2A is substituted for bis (benzene) chromium (O). Butadiene conversion after 24 hours at 40° C. is 15.8% with a cyclooligomer selectivity of 54% The only $C_{12}$ oligomers identified in the product are the trans,trans, trans and trans, trans, cis isomers of 1,5,9-cyclododecatriene, which are present in a ratio of 4.4.

EXAMPLES 3–9

In each of Examples 3–9, a clean dry magnetically stirred 300 ml. autoclave is charged with 1 gram of bis (benzene) chromium (O) 20 grams of benzene and the materials shown Table 1. This mixture is heated to 40° C. and stirred for one hour. Butadiene introduction is then begun as the temperature is raised to 80° C. This temperature is maintained for six hours during which the autoclave pressure is held at 90–100 p.s.i.g. by the periodic introduction of additional butadiene. Upon cooling and venting the autoclave, the liquid content is analyzed and in each case found to contain significant quantities of both cyclooctadiene and cyclododecatriene.

TABLE I

| Example | Halogenating agent | Solvent |
| --- | --- | --- |
| 3 | 0.6 g. $I_2$ | 40 ml. ethyl ether. |
| 4 | 0.4 g. $Br_2$ | Do. |
| 5 | 1g. t-butylchloride | None. |
| 6 | 1 g. allyl bromide | Do. |
| 7 | 1 g. iodobenzene | Do. |
| 8 | 0.6 g. diethylaluminum chloride | 20 g. toluene. |
| 9 | 0.4 g. ethylaluminum dichloride | Do. |

EXAMPLE 10

A clean dry magnetically stirred 300 milliliter autoclave is evacuated and charged with 2.92 grams of bis (cumene) chromium (O), 2.5 grams of iodine and 50 milliliters of methylene chloride. The mixture is stirred for 30 minutes at 40° C. Two moles of 1,3-butadiene are then added and the autoclave stirred at 40° C. for 24 hours. Butadiene conversion amounts to 20% with 67% selectivity to $C_8$ and $C_{12}$ cyclooligomers. The cyclododecatriene fraction, which amounts to about 1% of the $C_8$ and $C_{12}$ cyclooligomers, is entirely the cis, cis, transisomer.

EXAMPLE 11

The procedure of Example 1 is repeated except that 1 gram of chromium (II) chloride is substituted for bis (benzene) chromium (O). Recovery of unreacted butadiene is essentially quantatative.

EXAMPLE 12

A clean dry magnetically stirred 300 milliliter autoclave is evacuated and charged with 1.1 grams (3.77 millimoles) of bis (cumene) chromium (O), 19 millimoles of triethylaluminum, 25 milliliters of dry benzene and 94 grams of 1,3-butadiene. The autoclave is heated to 125° C. and maintained at this temperature for 90 minutes. Upon cooling and venting, the autoclave was opened and found to be filled with a sticky polymer.

EXAMPLE 13

A clean dry magnetically stirred 300 milliliter autoclave is evacuated and charged with 1.1 grams (3.77 millimoles) of bis (cumene) chromium (O), 4 millimoles of diethylaluminum chloride and 25 milliliters of dry benzene. The mixture is stirred for ten minutes at room temperature, at which time 19 millimoles of triethylaluminum and 106 grams of butadiene are added. The autoclave is heated to 125° C. and held at this temperature for 90 minutes. After cooling and venting unreacted gases, the catalyst is deactivated by adding 50 millimoles of methanol. Butadiene conversion is 91% with a 45% selectivity to cyclododecatriene.

EXAMPLE 14

A clean dry magnetically stirred 300 milliliter autoclave is evacuated anc charged with 1 gram of triphenylphosphine chromium pentacarbonyl (2.2 millimoles) and 20 grams of dry benzene. To this mixture are successively added 8 millimoles of diethylaluminum chloride, 8 millimoles of triethylaluminum and 98 grams of 1,3-butadiene. The autoclave is then heated to 100° C. and maintained at this temperature for three and one half hours, at which time it is cooled, vented and the catalyst deactivated by the addition of 50 milliliters of methanol. Butadiene conversion is 73% with selectivities of 88% for cyclododecatriene, 2.7% for cyclooctadiene and 5.2% for vinylcyclo hezene.

We claim:

1. Oligomerization process comprising contacting a conjugated aliphatic diene selected from butadiene and methyl-butadienes with a coordination complex of a molecular Lewis base and a chromium sub-halide.

2. The process of claim 1 wherein said diene is 1,3-butadiene.

3. The process of claim 1 wherein said complex chromium subhalide is a halide salt of an arene chromium (O) complex.

4. The process of claim 1 wherein said complex chromium subhalide is a halide salt of a chromium (O) complex with an ester of a trivalent Group VA element.

5. The process of claim 1 wherein said complex chromium subhalide is a halide salt of a chromium (O) carbonyl.

6. The process of claim 1 wherein said complex chromium sub-halide is produced by halogenating a complex of chromium (O) with a molecular Lewis base selected from the group consisting of unsaturated hydrocarbons, carbon monoxide and esters of trivalent Group VA elements, said halogenating being effected by contacting said chromium (O) complex with a halogenating agent selected from the group consisting of aliphatic hydrocarbyl halides, elemental halogens and aluminum halides.

7. Process of claim 1 wherein said oligomerization is conducted in the presence of a reducing agent.

8. Process of claim 7 wherein said reducing agent is an aluminum alkyl.

9. Process of claim 1 wherein said complex chromium subhalide is a reaction product of a molecular Lewis base complex of chromium (O) and a halogenating agent selected from the group consisting of aliphatic hydrocarbyl halides, elemental halogens and aluminum halides.

10. Catalyst composition comprising a chromium component and a reducing agent component, said chromium component being selected from the group consisting of a coordination complex of a molecular Lewis base with a chromium sub-halide and the interaction product of a molecular Lewis base complex of chromium (O) and an aliphatic hydrocarbyl halide, elemental halogen or aluminum halide halogenating agent.

11. The catalyst composition of claim 10 comprising a coordination complex of a molecular Lewis base with a chromium subhalide and a reducing agent selected from the group consisting of hydrocarbon soluble hydride and hydrocarbyl compounds of metals of Groups I through III and boron.

12. The catalyst composition of claim 10 comprising components:
(a) a molecular Lewis base complex of chromium (O)
(b) a halogenating agent and
(c) a reducing agent selected from the group consisting of hydrocarbon soluble hydride and hydrocarbyl compounds of metals of Groups I through III and boron.

13. The catalyst composition of claim 12 wherein said component (a) is an arene chromium (O) complex.

14. The catalyst composition of claim 12 wherein said component (a) is a chromium (O) carbonyl.

15. The catalyst composition of claim 12 wherein said component (a) is a chromium (O) complex of an ester of a trivalent Group VA element.

16. The catalyst composition of claim 12 wherein said component (b) is an elemental halogen having an atomic weight between 79 and 127.

17. The catalyst composition of claim 12 wherein said component (b) is an aluminum halide.

18. The catalyst composition of claim 12 wherein said component (b) is a liquid aliphatic halide.

19. The catalyst composition of claim 12 wherein said component (c) is an aluminum alkyl.

20. Catalyst composition comprising a molecular Lewis base complex of chromium (O) and a halogenating agent selected from the group consisting of elemental halogens and aluminum halides.

21. The catalyst composition of claim 20 wherein said halogenating agent is an elemental halogen having an atomic weight between 79 and 127.

22. The catalyst composition of claim 20 wherein said halogenating agent is a hydrocarbyl aluminum halide.

References Cited

UNITED STATES PATENTS

| | | |
|---|---|---|
| 3,366,701 | 1/1968 | Wadsworth. |
| 3,390,196 | 6/1968 | Chappell et al. |

DELBERT E. GANTZ, Primary Examiner

V. O'KEEFE, Assistant Examiner

U.S. Cl. X.R.

252—431; 260—438.5